United States Patent

[11] 3,611,286

[72] Inventor Arthur B. Cleveland
Route 1, Cotter, Ark. 72626
[21] Appl. No. 21,440
[22] Filed Mar. 20, 1970
[45] Patented Oct. 5, 1971

[54] DEVICE FOR SENSING THE POSITION OF A MOVING VEHICLE WITH RESPECT TO A FURROW
13 Claim, 8 Drawing Figs.
[52] U.S. Cl. ................................................. 340/61,
340/267, 340/282, 200/61.44
[51] Int. Cl. ........................................................ B60q 1/00
[50] Field of Search........................................... 340/61,
265, 266, 267, 282; 200/61.42, 61.43, 61.44,
61.45, 61.52

[56] References Cited
FOREIGN PATENTS
494,424 10/1938 Great Britain................ 340/61

Primary Examiner—Alvin H. Waring
Attorney—John D. Pope, III

ABSTRACT: A device for sensing the relative position of a moving vehicle with respect to a furrow in the ground includes a mounting frame adapted to be mounted on the vehicle, a vertically disposed elongated member swingably mounted to the mounting frame, and a bearing member rotatably mounted on the lower end of the elongated member. The elongated member is a helical spring and the bearing member is adapted to engage the deepest portion of the furrow. A switch is connected to the upper end of the elongated member and is adapted to respond to swinging movement of the elongated member so as to actuate indicator lights mounted on the vehicle whenever the elongated member moves out of its vertically disposed position.

INVENTOR
ARTHUR B. CLEVELAND
ATTORNEY

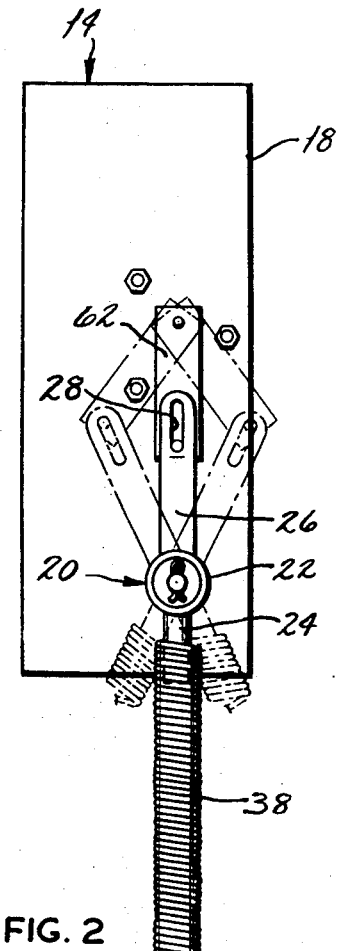
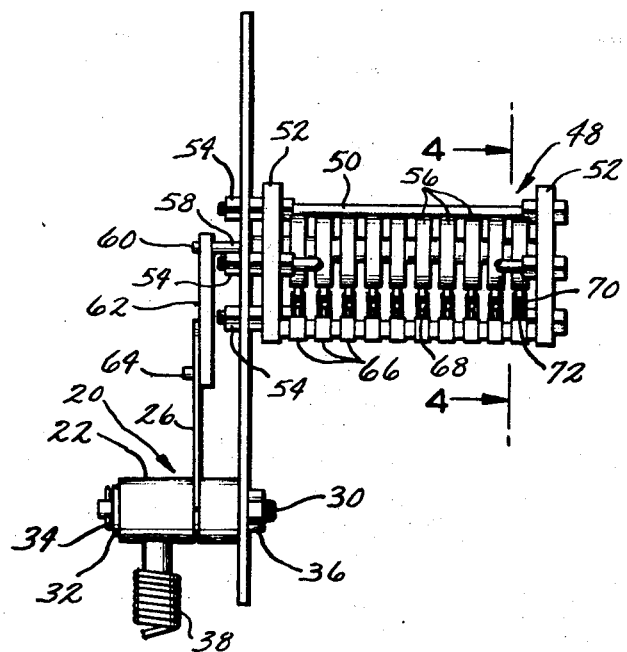
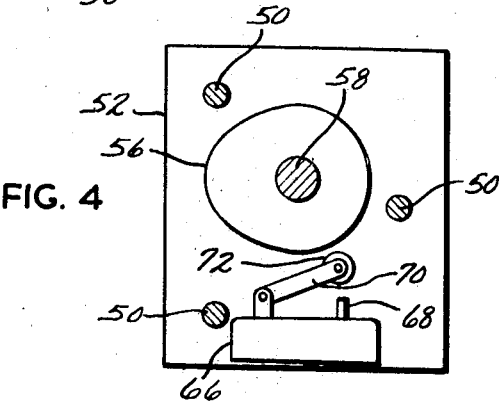
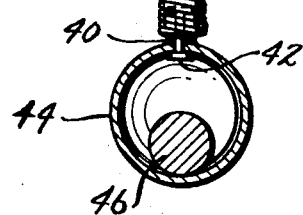
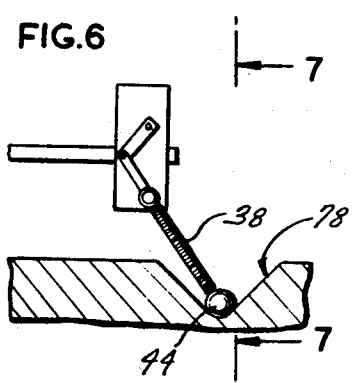
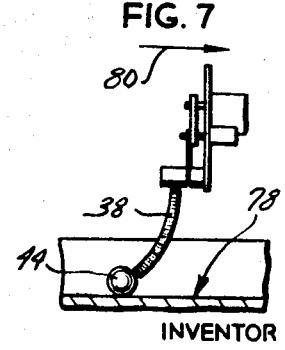
INVENTOR
ARTHUR B. CLEVELAND
BY
ATTORNEY

DEVICE FOR SENSING THE POSITION OF A MOVING VEHICLE WITH RESPECT TO A FURROW

This invention relates to a device for sensing the relative position of a moving vehicle with respect to a furrow in the ground.

Most farming operations require accurate positioning of the tractor during plowing, cultivating planting and other operations so as to maintain alignment and equal spacing of the farm implement with respect to the seed beds or planted rows in the field. Accurate gauging is most important during the planting operation because misalignment or varied row spacing causes difficulty during cultivating and harvesting. If the spacing of the rows varies throughout the field the farmer has difficulty lining up his other equipment with the rows. For example, the spacing of cultivator plows on the cultivator is set so that they will cultivate the soil as close as possible to the crop rows. If the distance between the rows is not constant throughout the field, the cultivator plows will plow out some of the planted rows during the cultivating operation. It is therefore important that the rows be planted so that they are parallel and spaced consistently throughout the field.

Gauging is presently being done, and for many years has been done, with a device called a row marker. A row marker is a mechanical articulated arm attached to the farm implement being pulled by the tractor. As the tractor and implement travel across the field, the row marker is swung laterally outwardly to engage the soil which the tractor and implement will operate upon during the return trip across the field. As the tractor and implement move across the field, the row marker makes a mark in the soil. During the return trip the operator aligns his tractor with this mark so that his row spacing will be constant. The length of the row marker of course depends upon the width of the farm implement and the width of the swath which it makes as it goes across the field. The wider the farm implement, the longer the row marker must be. The row marker engages the soil at its outer tip, and this causes a tremendous leverage to be applied to the point where the row marker is attached to the farm implement. As a result of this great leverage, row markers are often broken. They must be very sturdily constructed and consequently their cost of manufacture is high. Even after expending a large amount of money for a set of row markers, farmers find that quite often the markers are broken or damaged during the first day in the field.

This invention includes a device which eliminates the articulated row marker and instead uses a probe which aligns with and senses a furrow in that portion of the field upon which the farm implement has already operated. The sensing probe includes an elongated spring having a bearing member at its lower end which is adapted to ride in the deepest portion of the furrow. As the tractor moves laterally with respect to the furrow, the lower end of the probe remains in the deepest part of the furrow, and consequently the elongated spring swings out of vertical alignment. Switch means are provided for indicating on an instrument panel when the probe is out of vertical alignment. As a result, after having once aligned the probe in a furrow, the farmer can keep the tractor in accurate alignment with the furrow throughout the trip across the field without taking his eyes off the instrument panel.

Among the several objects of the present invention may be noted the provision of a device which will indicate the lateral position of a vehicle with respect to a furrow as the vehicle moves across the field; the provision of a device which will permit accurate positioning of the vehicle a predetermined distance from the furrow; the provision of a device including a sensing probe which will automatically seek the lowest portion of the furrow; the provision of a device which does not protrude as far laterally from the vehicle as presently known articulated row markers; the provision of a device which is less subject to breaking than present row markers; the provision of a device which permits the vehicle operator to accurately steer the vehicle with respect to a furrow merely by watching an instrument panel mounted on the vehicle; the provision of a device which includes a sensing probe having complete flexibility so that it can deflect out of shape and be left in such a state for long periods of time without losing its ability to snap sharply back into a proper working attitude when the stresses are relieved; the provision of a device which will seek the deepest portion of a furrow without making its own furrow in the soil; the provision of a device which can be connected to an automatic steering system for automatic steering of the vehicle with respect to the furrow; the provision of a device which is simpler in construction and requires fewer materials than presently known row marker devices; and the provision of a device which is economical to manufacture. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated, FIG. 1 is a rear elevational view of a vehicle having the sensing probe mounted thereon;

FIG. 2 is an elevational view of the sensing probe showing the bearing member in section;

FIG. 3 is a partial side view of FIG. 2;

FIG. 4 is a sectional view taken along line 4—4 of FIG. 3;

FIG. 6 is a rear elevational view showing the sensing probe in the bottom of a furrow;

FIG. 7 is a sectional view taken along line 7—7 of FIG. 6; and

Corresponding reference characters indicate corresponding parts throughout the several views of the drawings.

Figure 1:
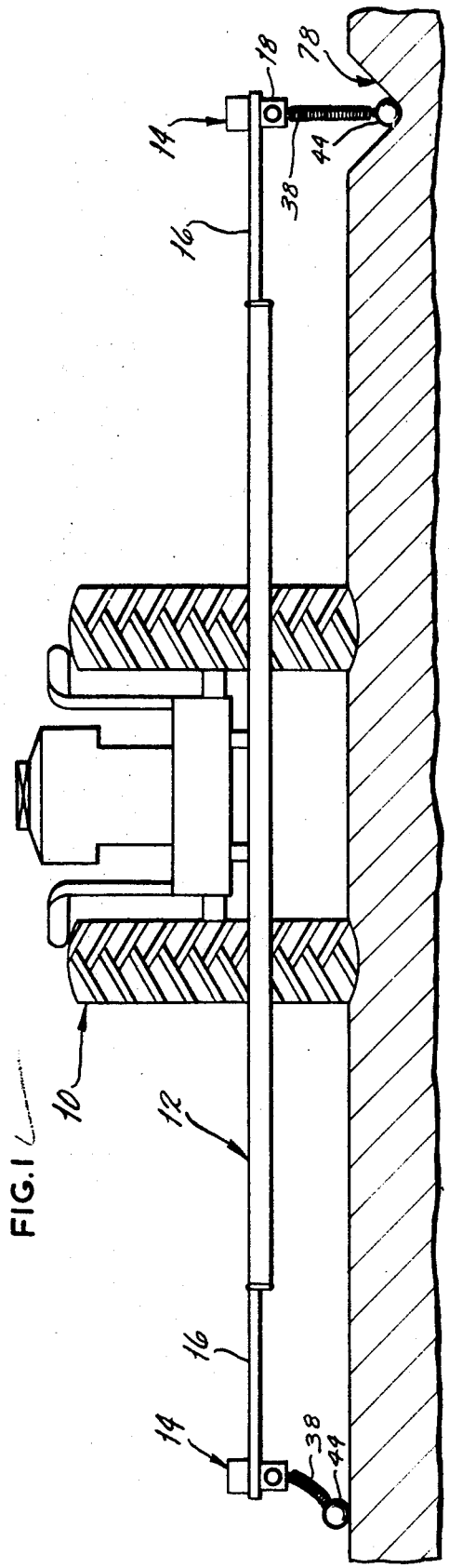

Referring to FIG. 1, a vehicle 10 has an implement frame 12 mounted thereon. The specific structure of the implement is not shown because it may be any implement used for farming such as a planter, a cultivator, a plow, etc. Extensibly mounted upon the opposite ends of implement frame 12 are two sensing probes 14. Probes 14 are shown mounted upon a telescopic boom 16, but they can be mounted in any other way which will permit lateral adjustment of their position with respect to vehicle 10.

Referring to FIGS. 2 and 3, sensing probe 14 includes a mounting plate 18 adapted to be mounted rigidly with respect to boom 16. Pivotally mounted on plate 18 is a swing member 20 including a collarlike hub 22, a downwardly extending stub 24 and an upwardly extending swing lever 26, all of which are welded together so that swing member 20 is a rigid member. An elongated slot 28 is provided in the upper end of swing lever 26. Hub 22 is rotatably mounted upon a hinge bolt 30 by means of bearings (not shown). A washer 32 is held against one axial end of hub 22 by means of a cotter pin 34. The opposite end of bolt 30 is rigidly secured to plate 18 by means of a nut 36. The particular pivotal mechanism used for swing member 20 may vary without detracting from the invention, but it must be sturdily constructed.

Rigidly connected to stub 24 and extending downwardly therefrom is an elongated helical spring 38. Spring 38 is flexible along its longitudinal axis but is adapted to maintain its straight configuration in absence of bending forces being applied thereto. Spring 38 and swing member 20 together form an elongated member which is free to swing about the axis provided by hinge bolt 30. Rigidly secured to the lower end of spring 38 is a swivel insert 40 having a swivel pin 42 rotatably mounted therein. A bearing member 14 is secured to swivel pin 42 and is adapted to rotate with respect to helical spring 38. Swivel pin 42 provides a pivotal axis for bearing member 44 which extends substantially along the longitudinal axis of helical spring 38. Bearing member 44 is bulbous in shape. Its particular configuration may be spherical or ellipsoid or any other shape so long as it includes a surface which will roll when contacting the ground. Bearing member 44 is illustrated in FIG. 2 as being hollow and including a heavy ball 46 which is sized so that it will roll freely within the interior surface of bearing member 44. The purpose of ball 46 is to facilitate the downward rolling of bearing member 44 whenever it is on a slanted surface such as the side of a furrow. Ball 46 is unnecessary, however, if the strength and configuration of spring 38 is properly chosen.

Referring to FIGS. 3 and 4, a switch mechanism 48 is operatively mounted on plate 18. It includes a plurality of rods 50 which interconnect two end plates 52 and which are secured to plate 18 by means of nuts 54. A plurality of cams 56 are fixed to a cam shaft 58 which is rotatably journaled in end plates 52 and which has one end 60 extending through plate 18. A switch link 62 is fixed to end 60 of cam shaft 58 and includes a slot pin 64 which extends within slot 28 of swing lever 26. As shown in shadow lines in FIG. 2, swinging movement of swing lever 26 causes switch link 62 and cam shaft 58 to rotate, thereby rotating cams 56.

A plurality of microswitches 66 are mounted on switch mechanism 48 in registered alignment below cams 56. Each microswitch 66 includes an actuating button 68 and a swingable arm 70 having a roller 72 mounted on its free end. Arms 70 are biased away from buttons 68 by spring means (not shown), but are adapted to swing toward buttons 68 and depress them in response to downward pressure exerted by cams 56. Each cam 56 has a predetermined rotational position with respect to cam shaft 58 so that various combinations of buttons 68 will be depressed depending upon the rotational position of cam shaft 58. The rotational position of cam shaft 58 in FIG. 3 is such that cams 56 do not cause any of buttons 68 to be depressed. This position of cams 56 occurs when spring 38 and swing lever 26 are vertically disposed. Swinging movement of swing lever 26 as shown by shadow lines in FIG. 2 causes various combinations of buttons 68 to be depressed. An instrument panel 74 (FIG. 4) includes a plurality of indicator lights 76. Each indicator light 76 is connected in series with an electrical power source and one of microswitches 66. Whenever a button 68 of one microswitch 66 is depressed the circuit is completed and the corresponding indicator light will be turned on. The positional arrangement of cams 56 on cam shaft 58 is such that whenever swing lever 26 is vertically disposed the center indicator light 76 of instrument panel 74 is the only light on. As swing lever 26 swings to the right, as viewed in FIG. 2, indicator lights 76 to the left of center begin to light up one at a time with the centermost lights being the first to be lit. As swing lever 26 swings to the left, those indicator lights 76 to the right of center become lit with the center lights being the first to be lit.

In operation sensing probe 14 is mounted on boom 16 and its lateral position with respect to vehicle 10 is adjusted so that when sensing probe 14 is vertically aligned over the center of a furrow 78, the implements mounted on implement frame 12 will be in the desired gauged alignment with respect to furrow 78. After the farmer has completed one trip across the field, he aligns one probe 14 with the last furrow formed by his first trip across the field. Bearing member 44 is positioned within furrow 78 so that it is in the deepest portion thereof. The probe 14 on the opposite end of implement frame 12 is inoperative at this point, and helical spring 38 of that probe is deflected due to the fact that there is no furrow in which bearing member 44 can ride. A switch 86 is provided on instrument panel 74 for permitting the operator to turn each probe 14 off and on selectively. One probe 14 will be switched on during the first trip across the field and the other will be switched on during the return trip.

The distance between mounting plate 18 and the deepest portion of furrow 78 is slightly less than the distance between hinge bolt 30 and the lower end of bearing member 44 so that helical spring 38 will be deflected in the manner shown in FIG. 7. In this position spring 38 exerts a force having a downward vertical component on bearing member 44. Because spring 38 is bent, the pivotal axis of bearing member 44 is moved out of a vertical attitude. The motion of vehicle 10 which is indicated by arrow 80 in FIG. 7 causes bearing member 44 to be dragged rearwardly with respect to vehicle 10. Consequently the pivotal axis between bearing member 44 and helical spring 38 is disposed at an angle which leaves bearing member 44 free to roll laterally within furrow 78.

If vehicle 10 moves to the left from its position shown in FIG. 1, a result is obtained such as shown in FIG. 6. As the vehicle begins to move to the left, bearing member 44 begins to ride up on the slanted surface of furrow 78. Spring 38 exerts a downward force on bearing member 44, but the slanted side of furrow 78 causes this downward force to have a lateral component in the direction of the deepest portion of the furrow. This lateral force causes bearing member 44 to roll towards the deepest portion of the furrow because the pivotal axis of bearing member 44 permits it to roll laterally in furrow 78. Consequently, even though vehicle 10 may move laterally with respect to furrow 78, bearing member 44 will always seek the deepest portion of the furrow.

The ability of bearing member 44 to roll into the deepest portion of the furrow is dependent upon several factors. The strength and flexibility of spring 38 is one of these factors. Spring 38 must be capable of deflection in any direction, and when deflected, it must exert a substantial downward force on bearing member 44. This downward force, however, should not be so great that bearing member 44 plows into the soil and makes a furrow of its own.

The tendency of bearing member 44 to roll downwardly whenever it is on a slanted surface may also be facilitated by including ball 46 within bearing member 44. In the absence of friction, bearing member 44 would always roll when on a slanted surface, but such factors as softness of the soil and the friction in the pivotal axis of bearing member 44 inhibit this free-rolling action. Ball 46 is not necessary if the strength of spring 38 is properly chosen. For example, if spring 38 has a length of 17 inches, has an outer diameter of 1¼ inches, and is wound from approximately 0.15-inch spring wire, then bearing member 44 will roll freely without having ball 46 contained within its interior.

As vehicle 10 begins moving across the field, sensing probe 14 is aligned so that it is vertically disposed within furrow 78. If vehicle 10 moves laterally with respect to furrow 78, bearing member 44 remains within the deepest portion of furrow 78 as described above. This causes spring 38 and swing lever 26 to swing about hinge bolt 30 so that the longitudinal axes of spring 38 and swing lever 26 are displaced from a vertical position. Swinging of swing lever 26 causes cam shaft 58 to be rotated by means of switch link 62, thereby causing several microswitches 66 to actuate indicator lights 76 on instrument panel 74. Thus the moment that sensing probe 14 moves out of a vertically disposed attitude, the vehicle operator knows immediately from the indicator lights that he has deviated from a parallel path with respect to furrow 78. He is therefore able to take corrective steering measures.

Figure 8:
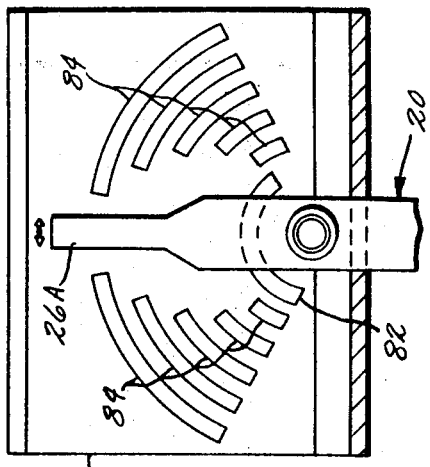
FIG. 8 is a partial elevational view of a modification of the invention.
Figure 5:
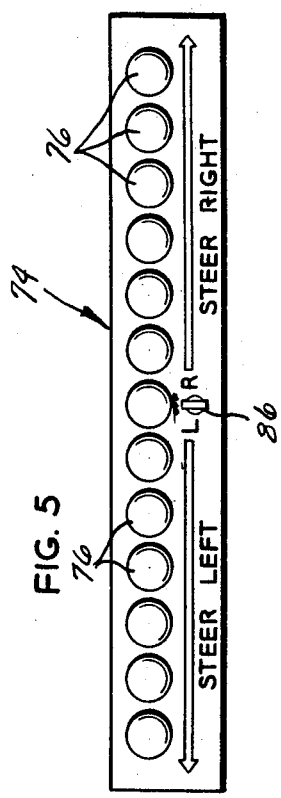
FIG. 5 is an elevational view of the instrument panel.

Referring to FIG. 8, a modified from of switch mechanism is shown. Mounted on mounting plate 18 are a universal contact 82 and a plurality of secondary contacts 84. Swing member 20 is provided with a modified swing lever 26A which is made of electrically conductive material and which is adapted to engage universal contact 82 at all times during its swinging movement. Secondary contacts 84 are spaced in a predetermined position relative to swing lever 26A so that different combinations of contacts will be engaged by swing lever 26A, dependent upon the relative swinging position of lever 26A. Each secondary contact 84 is connected to one indicator light 76, and universal contact 82 is connected to a power source (not shown). As swing lever 26A swings out of vertical alignment it completes the circuit between universal contact 82 and secondary contacts 84 so as to actuate indicator lights 76 on panel 74. The further swing lever 26A moves out of vertical alignment, the more circuits it completes, thereby indicating on the instrument panel that it is moving away from rather than toward vertical alignment.

While two forms of switching mechanisms are shown in the drawings, various other mechanisms can be used without detracting from the invention. The primary requisite of the switching mechanism is that it must indicate in varying degrees on the instrument panel how far sensing probe 14 has moved out of vertical alignment.

Helical spring 38 is the preferred type of spring member to be used on sensing probe 14. However, other types of springs may also be employed. For example, an elongated strip of spring steel can be used if it has the necessary flexibility and durability. The spring must be completely flexible so that it will bend in any direction, and yet it must still exert enough force on bearing member 44 to cause it to be urged toward the deepest portion of the furrow. The flexibility of the spring should be such that it will not vary in response to changes in atmospheric conditions. It must be able to return to its original shape even after being stressed and deflected for long periods of time.

The pivotal axis of swing member 20 about hinge bolt 30 should preferably extend in a direction which is approximately parallel to the direction of movement of vehicle 10. Thus the direction of swinging movement of sensing probe 14 is lateral with respect to vehicle 10. The pivotal axis of bearing member 44, while shown to be in vertical alignment with the longitudinal axis of spring 38, may be varied without detracting from the invention. This axis may extend in any direction which permits lateral rolling movement of bearing member 44 with respect to vehicle 10 when spring 38 is deflected. Referring to FIG. 2, the pivotal axis of bearing member 44 and the swing axis of swing member 20 are shown to be perpendicular to one another. They both lie in the same vertical plane. It is possible for the rotational axis of bearing member 44 to be rotated to any position within this plane without detracting from the operability of the invention. It is also possible for the rotational axis of bearing member 44 to extend in any direction lying within a vertical plane which is parallel to the direction of movement of the vehicle.

While an instrument panel having indicator lights is shown to be connected to switch mechanism 48, other automatic devices may also be connected to this system. For example, an automatic steering system having hydraulically operated steering controls may be connected to the system for complete automatic steering.

The sensing device of this invention permits the vehicle operator to steer the vehicle merely by watching the lights on the indicator panel. Experimentation has shown that accurate steering can be obtained within a few inches without watching anything but the lights on the instrument panel. The resiliency of the spring is such that it always forces the bearing to the lowest portion of the furrow but it is not so great that it causes the bearing to dig a furrow of its own in the soil. The probe is always "live" and seeks the lowest portion of the furrow.

The sensing probe of this invention is extremely durable. The stress caused by the dragging of bearing member 44 on the ground is absorbed by spring member 38 so as to minimize leverage applied to the rigid parts such as hinge bolt 30 and mounting plate 18. Thus the stress in the rigid parts of this invention is significantly reduced from that in articulated row markers presently known. The device of this invention is also very simple in construction and uses considerably fewer materials than the articulated row markers presently known in the art.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A device for sensing the relative position of a moving vehicle with respect to a furrow in the ground; said device comprising a mounting frame adapted to be mounted on said vehicle; an elongated member pivotally connected to said mounting frame for swinging movement about a first axis; said elongated member having an upper and a lower end and being flexible along at least a portion of its length so that it will yieldably deflect with respect to its longitudinal axis; and a bearing member adapted to frictionally engage the ground; said bearing member being rotatably mounted on said lower end for rotation about a second axis so as to facilitate free swinging movement of said elongated member about said first axis when said bearing member engages the ground.

2. A device according to claim 1, wherein said second axis and said first axis are disposed in approximately the same plane when said elongated member is fee from deflection.

3. A device according to claim 1, wherein said second axis and the longitudinal axis of said elongated member are in approximately the same plane when said elongated member is free from deflection.

4. A device according to claim 1, wherein said mounting member is adapted to be carried by said vehicle with said first axis pointing in a direction approximately parallel to the direction of movement of said vehicle; said second axis being in a vertical plane which is approximately parallel to the vehicle's direction of movement when said elongated member is vertically disposed and is free from deflection.

5. A device according to claim 1, wherein said second axis is vertically disposed when said elongated member is vertically disposed.

6. A device according to claim 1, wherein said bearing member is bulbous in shape.

7. A device according to claim 6, wherein said bearing member is hollow and a heavy ball is within said bearing member; said ball being free to roll around the interior surface of said bearing member.

8. A device according to claim 1, wherein said elongated member includes a helical spring.

9. A device according to claim 8, wherein said helical spring has an outer diameter of approximately 1¼ inches and is formed from approximately 0.15-inch spring wire.

10. A device according to claim 1, wherein switch means are mounted on said mounting member; an instrument panel being adapted for mounting on said vehicle and including at least one electrically energizable indicator; said switch means being electrically connected in series between said indicator and a power source for controlling energization and deenergization of said indicator; mechanism interconnecting said switch means and said elongated member for causing said switch means to energize and deenergize said indicator in response to swinging movement of said elongated member about said first axis.

11. A device according to claim 10, wherein said mechanism includes at least one actuating member which is movable into and out of engagement with said switch means in response to swinging movement of said elongated member.

12. A device according to claim 11, wherein said actuating member is a cam.

13. A device according to claim 11, wherein said switch means includes at least two spaced contacts and said actuating member is an electrical conductor; said actuating member being movable from an open position wherein it engages one of said contacts and is spaced from the other of said contacts to a closed position wherein it engages both of said contacts.